United States Patent [19]

Ohtaka

[11] Patent Number: 4,885,830
[45] Date of Patent: Dec. 12, 1989

[54] PROCESS OF PRODUCING A VALVE ELEMENT

[75] Inventor: Yoshimitsu Ohtaka, Shizuoka, Japan

[73] Assignee: Tokyo Electric Co., Ltd., Tokyo, Japan

[21] Appl. No.: 311,835

[22] Filed: Feb. 17, 1989

Related U.S. Application Data

[62] Division of Ser. No. 146,782, Jan. 21, 1988, Pat. No. 4,821,999.

[30] Foreign Application Priority Data

Jan. 22, 1987 [JP] Japan .................................. 62-13066
Mar. 13, 1987 [JP] Japan .................................. 62-58507

[51] Int. Cl.⁴ .............................................. B21D 53/00
[52] U.S. Cl. .............................. 29/157 C; 29/157.1 R; 29/458; 427/54.1; 427/282; 427/405; 427/407.2
[58] Field of Search ............... 29/157 C, 157.1, 527.2, 29/458, 825; 251/129.02, 129.05, 129.08; 357/26; 346/140; 427/54.1, 282, 405, 407.2; 430/320, 323

[56] References Cited

U.S. PATENT DOCUMENTS

| | | | |
|---|---|---|---|
| 3,500,380 | 3/1970 | Jessee | 251/129.05 X |
| 3,523,677 | 8/1970 | North | 251/129.05 |
| 4,203,128 | 5/1980 | Guckel et al. | |
| 4,545,561 | 10/1985 | Brown | 251/129.08 |
| 4,560,991 | 12/1985 | Schutrum | 29/825 |
| 4,574,445 | 3/1986 | Bentin et al. | 29/157 C |
| 4,581,624 | 4/1986 | O'Connor | 357/26 |
| 4,585,209 | 4/1986 | Aine et al. | 251/129.02 |
| 4,628,330 | 12/1986 | Suga et al. | 251/129.01 X |
| 4,658,269 | 4/1987 | Rezanka | 29/825 X |
| 4,680,859 | 7/1987 | Johnson | 29/157 CX |
| 4,716,423 | 12/1987 | Chan et al. | 29/157 CX |
| 4,733,447 | 3/1988 | Ageishi | 29/157 C |

FOREIGN PATENT DOCUMENTS

| | | | |
|---|---|---|---|
| 0250948 | 9/1987 | European Pat. Off. | |
| 0113470 | 9/1981 | Japan | 29/157 C |
| 0182449 | 11/1982 | Japan | 29/157 C |
| 0224760 | 12/1983 | Japan | 29/157 C |
| 2155152 | 9/1985 | United Kingdom . | |

OTHER PUBLICATIONS

Xerox Disclosure Journal "Process for Fabrication of Ink Jet Orifices", William R. Gardner, vol. 4, No. 2 Mar./Apr. 1979 pp. 251-252.

Primary Examiner—Howard N. Goldberg
Assistant Examiner—Ilene Cuda
Attorney, Agent, or Firm—Oblon, Spivak, McClelland, Maier & Neustadt

[57] ABSTRACT

A nozzle plate in which a nozzle through which fluid can pass is formed is prepared, and an insulator layer is located in layer on the nozzle plate except a location of the nozzle. An electrode plate is provided so as to cover the insulator layer, and a valve beam made of a conductive substance is located in an opposing relationship to the nozzle plate. A valve for opening and closing said nozzle is formed at a yieldable portion of the valve beam opposing to the nozzle. Upon energization of the electrode plate and the valve beam of a valve element thus produced, the valve is attracted toward the electrode plate to open or close the valve. Binary control of the valve to fully open or fully close the nozzle and infinite control of the valve to infinitely open or close the nozzle can be readily attained in the valve element.

9 Claims, 16 Drawing Sheets

PROCESS OF PRODUCING A VALVE ELEMENT

This is a division, of application Ser. No. 07/146,782, filed on Jan. 21, 1988 and now U.S. Pat. No. 4,821,999.

FIELD OF THE INVENTION AND RELATED ART STATEMENT

This invention relates to a valve element for controlling a flow of fluid and a process of producing the same, and more particularly to a valve element of a structure suitable not only for binary control of a flow of fluid between a fully open condition and a fully closed condition but also for infinite control of a flow of fluid and a process of producing the same.

A valve element is already disclosed in Japanese Patent Laid-Open No. 61-144361 wherein a conductor loop including a plurality of pairs of strings which have inner ends coupled to each other by a coupling member and outer ends isolated from each other by an insulator layer is provided in an ink chamber formed by a base and a cover which are mounted in an opposing relationship to each other and have a plurality of outlet ports formed therein while a magnet mechanism is provided on an outside face of the cover, whereby the magnetic flux to be developed from the magnet mechanism is changed by energization of the conductor loop to displace the inner ends of the strings toward the outlet port side thereby to extrude ink within the ink chamber by way of the outlet ports.

Meanwhile, a process of producing a valve element is disclosed in Japanese Patent Laid-Open No. 59-110967 wherein the process comprises the steps of forming a conductor layer on a surface of a substrate, forming a photo-resist layer on a surface of the conductor layer, exposing the photo-resist layer to light of a pattern of a valve seat, forming by development a pattern wherein the conductor layer is exposed in the configuration of the valve seat, plating nickel on a portion of the conductor layer on which no photo-resist layer is formed in order to form a valve seat, forming a spacer at a central portion of the valve seat from photo-resist, forming another conductor layer of nickel or the like on a surface of the valve seat including the spacer, forming a pattern of a valve member on a surface of the latter conductor layer from a photo-resist, plating nickel on the surface of the conductor layer in accordance with the pattern to form a valve seat, and finally dissolving unnecessary portons of the conductor layers, photo-resist layers and spacers.

Drawbacks of such conventional techniques will now be described. The valve element disclosed in Japanese Patent Laid-Open No. 61-144361 has a drawback that it is complicated in structure because it requires a magnet mechanism. Besides, there are problems that it requires a relatively great number of man-hours for assembly thereof and it is low in accuracy in assembly because it involves a large number of parts. Further, if nickel which is one of ferromagnetic substances is used for a base of such a magnet mechanism, the magnetic flux developed from the magnet mechanism will concentrate on the base so that the density of magnetic flux around a conductor loop will become low accordingly, which will make it difficult for the conductor loop to operate in response to a change in energizing current flow therethrough. Besides, if nickel is used for strings of the conductor loop, the power consumption will increase because the strings are attached to the magnet mechanism so that the electric resistance thereof will be increased accordingly. Because of such reasons, electroforming of nickel cannot be adopted, and accordingly the valve element has drawbacks that the corrosion resistance is low and the high degree of accuracy in dimension cannot be maintained for a long period of time.

Meanwhile, according to the process of producing a valve element disclosed in Japanese Patent Laid-Open No. 59-110967, a valve seat and a valve member are formed by plating. However, the process is intended to produce a check valve and is not suitable as a process of producing a valve element for controlling a flow rate or for binary control to fully close or fully open a flow passage.

OBJECTS AND SUMMARY OF THE INVENTION

It is a first object of the present invention to provide a method for producing a valve element which can maintain a high degree of accuracy in dimension for a long period of time and a process of producing such a valve element.

It is a second object of the present invention to provide a method for producing a valve element which is suitable for controlling a flow rate or for binary control to fully close or fully open a flow passage and a process of producing the same.

It is a third object of the present invention to provide a method for producing a valve element of a simplified structure and a process of producing the same.

It is a fourth object of the present invention to provide a method for producing a valve element which is easy to produce and a process of producing the same.

It is a fifth object of the present invention to provide a method for producing a valve element which can be produced with a high degree of accuracy and a process of producing the same.

It is a sixth object of the present invention to provide a method for producing a valve element wherein the power consumption is relatively low and a process of producing the same.

It is a seventh object of the present invention to provide a method for producing a valve element through which fluid can flow smoothly when a flow passage is opened and a process of producing the same.

It is an eighth object of the present invention to provide a method for producing a valve element which can stop a flow of fluid with certainty when a flow passage is closed and a process of producing the same.

It is a ninth object of the present invention to provide a method for producing a valve element wherein electric connection thereof to a nozzle plate and a valve beam can be made readily and a process of producing the same.

It is a tenth object of the present invention to provide a method for producing a valve element wherein the durability of a valve beam can be improved and a process of producing the same.

It is an eleventh object of the present invention to provide a method for producing a valve element wherein a nozzle can be made minute and a process of producing the same.

According to another aspect of the present invention, there is provided a process of producing a valve element which comprises a nozzle pattern forming step of forming a photo-resist layer corresponding to a nozzle on a surface of a substrate, a nozzle plate forming step of forming a metal film on the surface of the substrate and removing the photo-resist layer to form a nozzle plate having a nozzle therein, a first insulator layer forming step of forming a first insulator layer on a surface of the nozzle plate such that openings may be formed at a location opposing to the nozzle and other predetermined locations, an electrode pattern forming step of forming a photo-resist layer on a surface of the first insulator layer around a location opposing to the nozzle, an electrode plate forming step of forming a metal film on a surface of the first insulator layer and removing the photo-resist layer to form an electrode plate, a second insulator layer forming step of forming on the surface of the first insulator layer a second insulator layer which covers the electrode plate such that openings may be formed in an opposing relationship to the openings of the first insulator layer, a spacer forming step of forming a spacer of a material different from a material of the nozzle plate on a surface of the second insulator layer including a location opposing to the nozzle and an area around the location, a valve beam pattern forming step of forming a photo-resist layer on a surface of the spacer except a location opposing to the nozzle and a location opposing to a peripheral portion of the spacer, a valve beam forming step of forming a metal film on the surface of the spacer to form a valve beam which is contiguous at an end portion thereof to the nozzle plate via one of the openings and which has a valve at a yieldable portion thereof and then removing the photo-resist, and a separating step of removing a central portion of the spacer including a portion opposing to the nozzle and then exfoliating the substrate from the nozzle plate. Accordingly, a nozzle plate, a first insulator layer, an electrode plate, a second insulator layer, a spacer, a valve beam and so on can be formed one after another in layer without depending upon an assembling operation, and besides it is enabled to form patterns for a nozzle plate, an electrode plate and a valve beam from photo-resist layers and easily form them by plating or by a thin film forming technique or the like. Accordingly, a valve element can be provided which can be produced readily with a high degree of accuracy.

DESCRIPTION OF THE PREFERRED EMBODIMENTS

Figure 1:
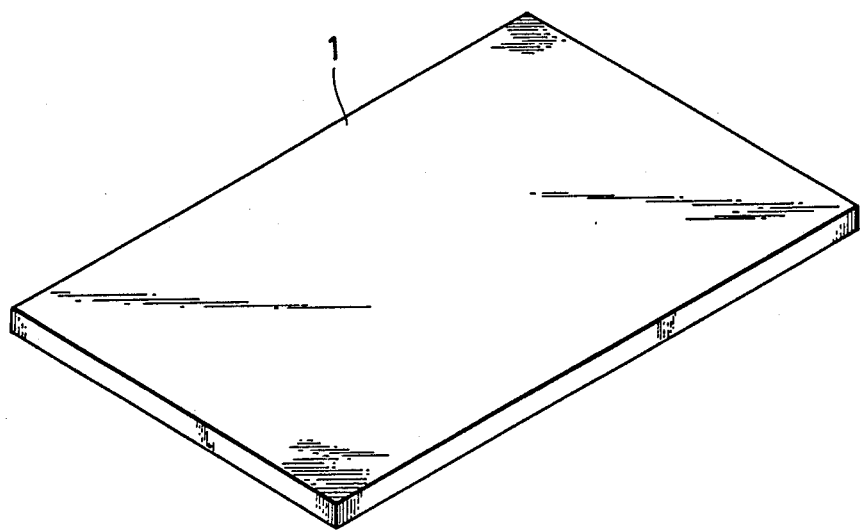
FIG. 1 is a perspective view of a substrate showing a first embodiment of the present invention.
Figure 2:
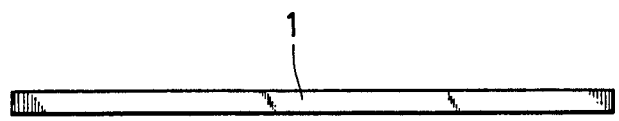
FIG. 2 is a side elevational view of the substrate of FIG. 1.

The first embodiment of the present invention will now be described with reference to FIGS. 1 to 24. At first, such a substrate 1 as shown in FIGS. 1 and 2 is prepared. The substrate 1 is formed either from a metal plate such as a stainless steel plate the surface of which is finished into a surface of a mirror by polishing or from a glass plate which has a metal film formed on a surface thereof by a suitable means such as vapor deposition. The surface of the substrate 1 is preferably formed from a metal material which has a low adhering property to nickel. From this point of view, a stainless steel plate is suitable for the surface of the substrate 1.

Figure 3:
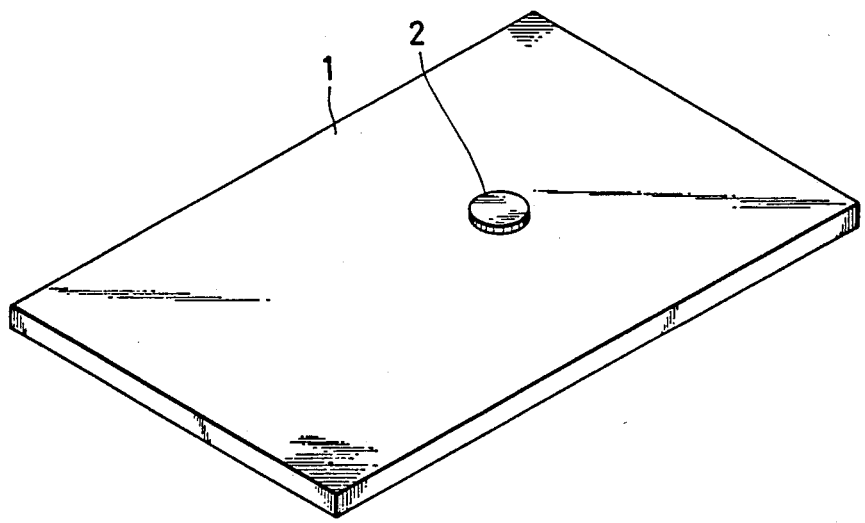
FIG. 3 is a perspective view of the substrate of FIG. 1 after it has passed a nozzle pattern forming step.
Figure 4:
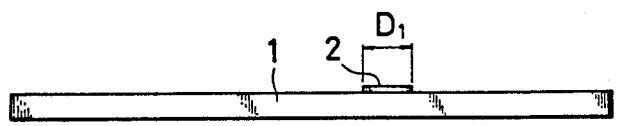
FIG. 4 is a side elevational view of the substrate of FIG. 3.

FIGS. 3 and 4 show the substrate 1 after it has passed a nozzle pattern forming step. At the step, a photo-resist layer 2 is formed on a surface of the substrate 1 and is exposed to light to effect development to form a pattern corresponding to a nozzle. The photo-resist layer 2 has a predetermined diameter $D_1$.

Figure 5:
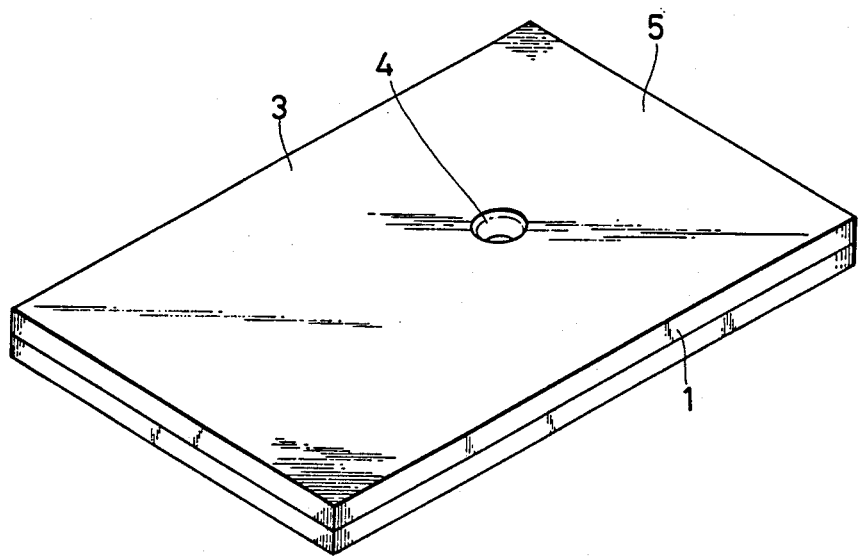
FIG. 5 is a perspective view of the substrate of FIG. 3 after it has passed a nozzle plate forming step.
Figure 6:
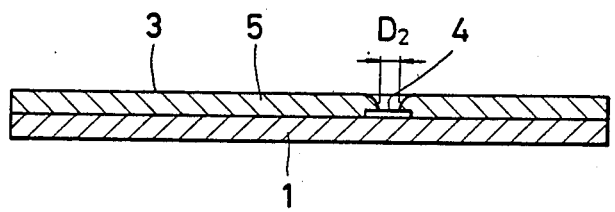
FIG. 6 is a vertical sectional side elevational view of the substrate of FIG. 5.

FIGS. 5 and 6 show the substrate 1 after it has further passed a first nozzle plate forming step. At the step, a metal film 3 is formed on the surface of the substrate 1 and the photo-resist layer 2 is removed to form a nozzle plate 5 which has a nozzle 4 formed therein. In this instance, since the metal film 3 covers over around the photo-resist layer 2, the nozzle 4 presents a trumpet-like configuration wherein the diameter thereof gradually increases toward a surface of the nozzle plate 5. The diameter $D_2$ of a minimum diameter portion of the nozzle 4 is smaller than $D_1$ and is about 10 microns or so. It is a matter of course that the nozzle 4 corresponds to the location from which the photo-resist layer 2 is removed. The metal plate 3 is formed by nickel plating using a sulfamic acid nickel bath.

Figure 7:
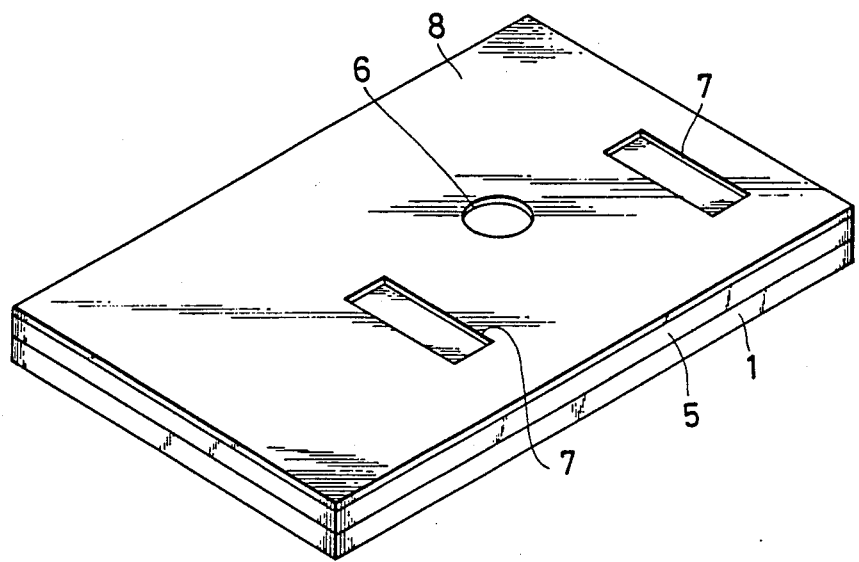
FIG. 7 is a perspective view of the substrate of FIG. 5 after it has passed a first insulator layer forming step.
Figure 8:
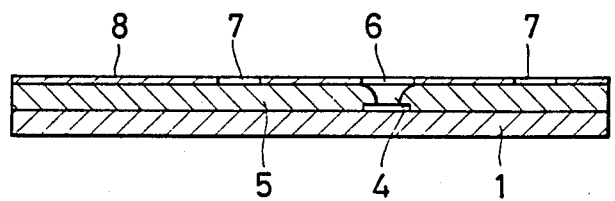
FIG. 8 is a vertical sectional side elevational view of the substrate of FIG. 7.

FIGS. 7 and 8 show the substrate 1 after it has further passed a first insulator layer forming step. At the step, a first insulator layer 8 is formed on a surface of the nozzle plate 5 such that an opening 6 and another pair of openings 7 are formed at a portion thereof corresponding to the nozzle 4 and at a pair of other predetermined portions thereof, respectively. The first insulator layer 8 is formed by forming a layer of photosensitive polyimide on the surface of the nozzle plate 5 and then by exposing the layer to light of a pattern for the openings 6 and 7 to effect development thereof.

Figure 9:
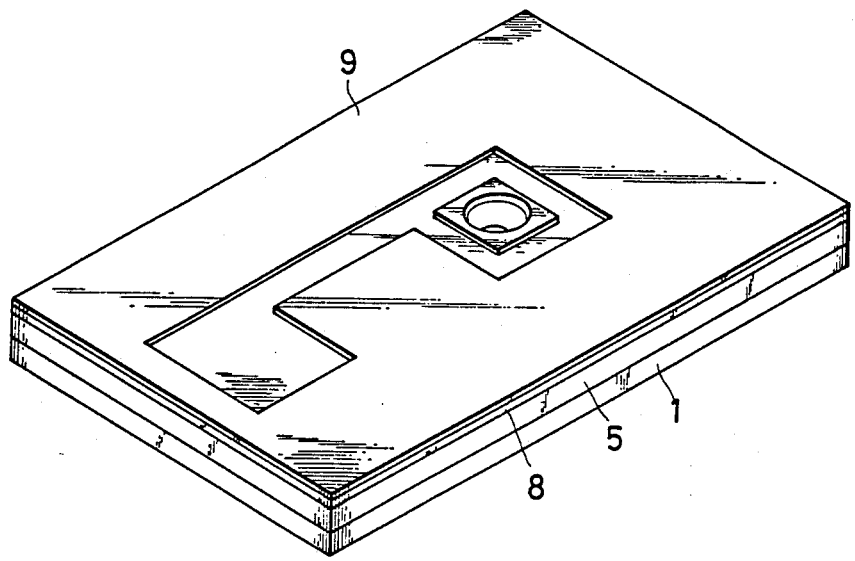
FIG. 9 is a perspective view of the substrate of FIG. 7 after it has passed an electrode pattern forming step.
Figure 10:
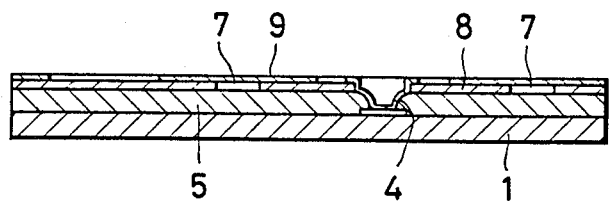
FIG. 10 is a vertical sectional side elevational view of the substrate of FIG. 9.

FIGS. 9 and 10 show the substrate 1 after it has further passed an electrode pattern forming step. At the step, a photo-resist layer 9 is formed on a surface of the first insulator layer 8 around a location opposing to the nozzle 4.

Figure 11:
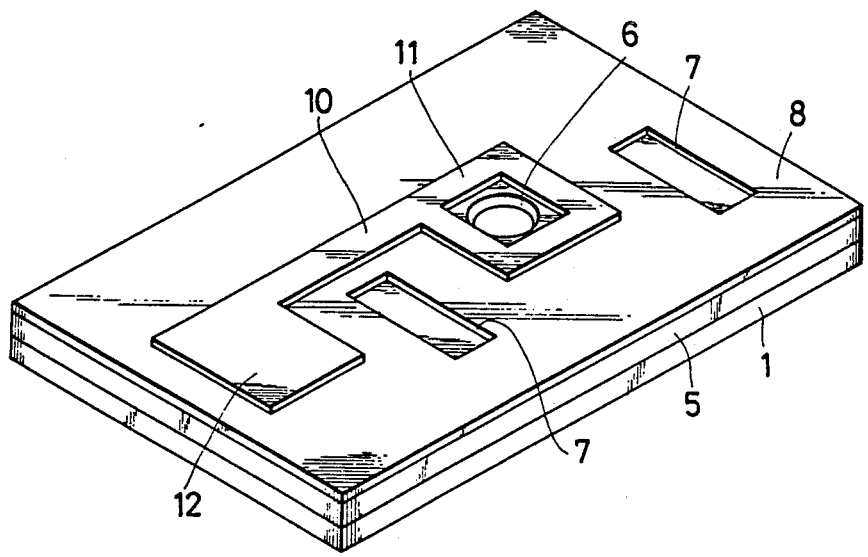
FIG. 11 is a perspective view of the substrate of FIG. 9 after it has passed an electrode plate forming step.
Figure 12:
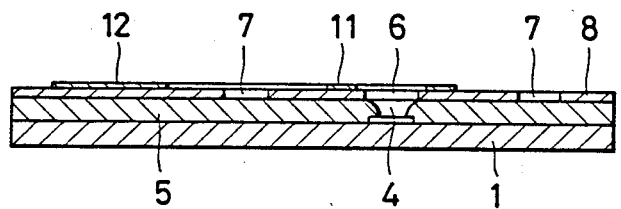
FIG. 12 is a vertical sectional side elevational view of the substrate of FIG. 11.

FIGS. 11 and 12 show the substrate 1 after it has further passed an electrode plate forming step. At the step, a metal film 10 is formed on a portion of the surface of the first insulator layer 8 on which the photo-resist layer 9 is not formed and then the photo-resist layer 9 is removed from the insulator layer 8 to form an electrode plate 11. A connecting portion 12 to be connected to a power source or the like which will be hereinafter described is formed at part of the electrode plate 11. The metal film 10 is formed by non-electrolytic nickel plating and then by nickel plating in order to provide a conductor layer which has a high adhering property to the first insulator layer 8. It is to be noted that the latter nickel plating may be effected using a sulfamic acid nickel bath.

Figure 13:
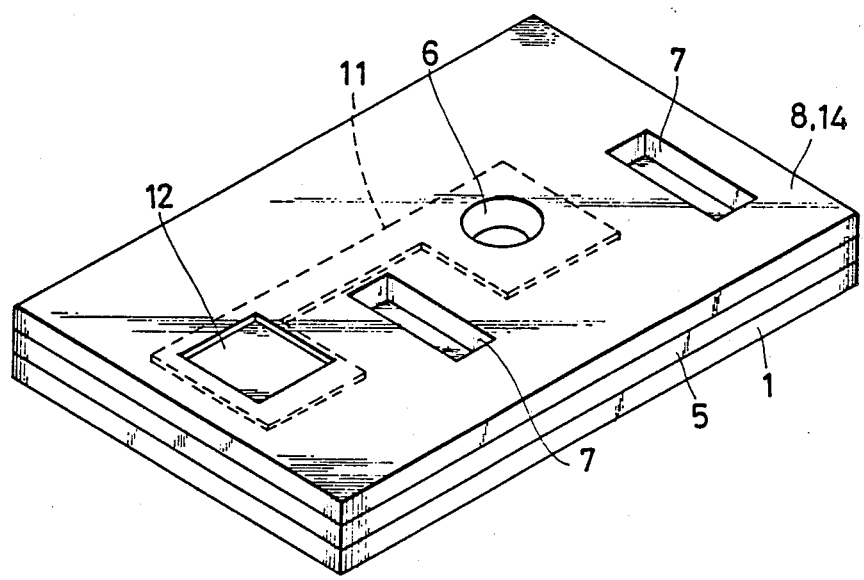
FIG. 13 is a perspective view of the substrate of FIG. 11 after it has passed a second insulator layer forming step.
Figure 14:
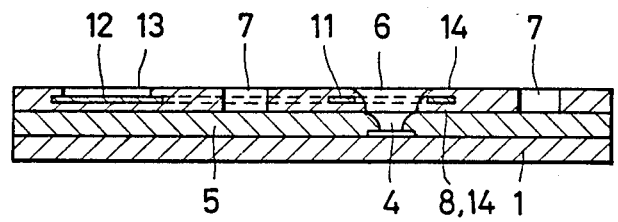
FIG. 14 is a vertical sectional side elevational view of the substrate of FIG. 13.

FIGS. 13 and 14 show the substrate 1 after it has further passed a second insulator layer forming step. At the step, a second insulator layer 14 is formed on the surfaces of the first insulator layer 8 and the electrode plate 11 such that openings 6 and 7 and an opening 13 may be formed in portions of the second insulator layer 14 corresponding to the openings 6 and 7 of the first insulator layer 8 and the connecting portion 12 of the electrode plate 11, respectively. The second insulator layer 14 is formed by applying photosensitive polyimide in the liquid state to the surfaces of the first insulator layer 8 and the electrode plate 11 and then by exposing, after drying, the polyimide layer to light of a pattern for the openings 6, 7 and 13 to effect development of the latter. After then, the second insulator layer 14 is heated so as to unite the same with the first insulator layer 8.

Figure 15:
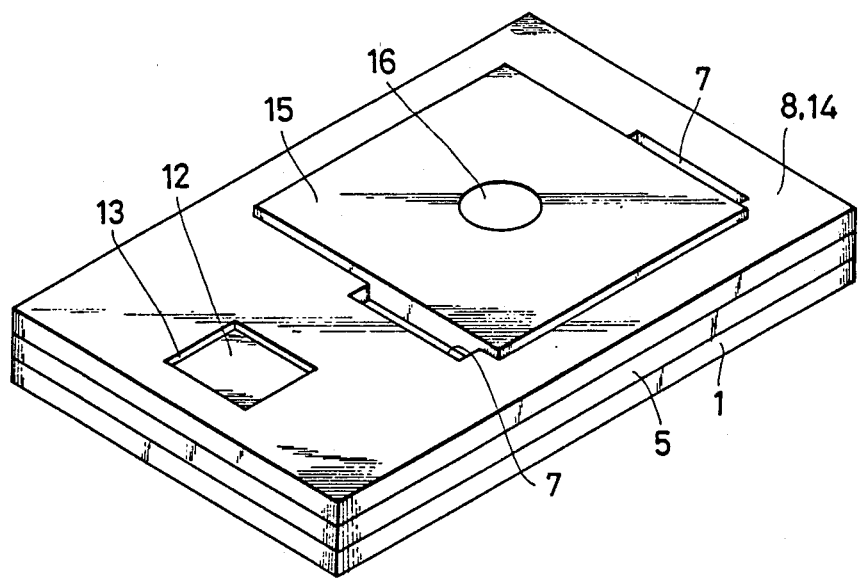
FIG. 15 is a perspective view of the substrate of FIG. 13 after it has passed a spacer forming step.
Figure 16:
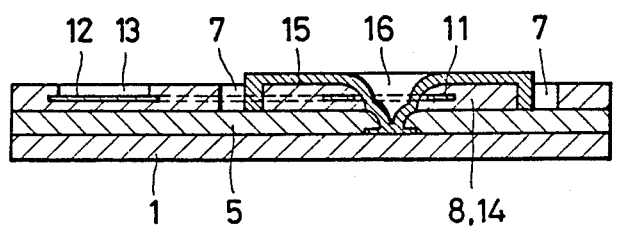
FIG. 16 is a vertical sectional side elevational view of the substrate of FIG. 15.

FIGS. 15 and 16 show the substrate 1 after it has further passed a spacer forming step. At the step, a spacer 15 is formed by sputtering copper on a surface of a protective layer 40 including a location opposing to the nozzle 4 and an area around the location using a suitable masking. Accordingly, the spacer 15 is formed with a thickness of 10 to 20 microns on surfaces of the protective layer 40 and the electrode plate 11 and inner faces of the nozzle 4 and the openings 6, and a recess 16 having a similar configuraton to the inner face of the openings 6 is formed in the spacer 15.

Figure 17:
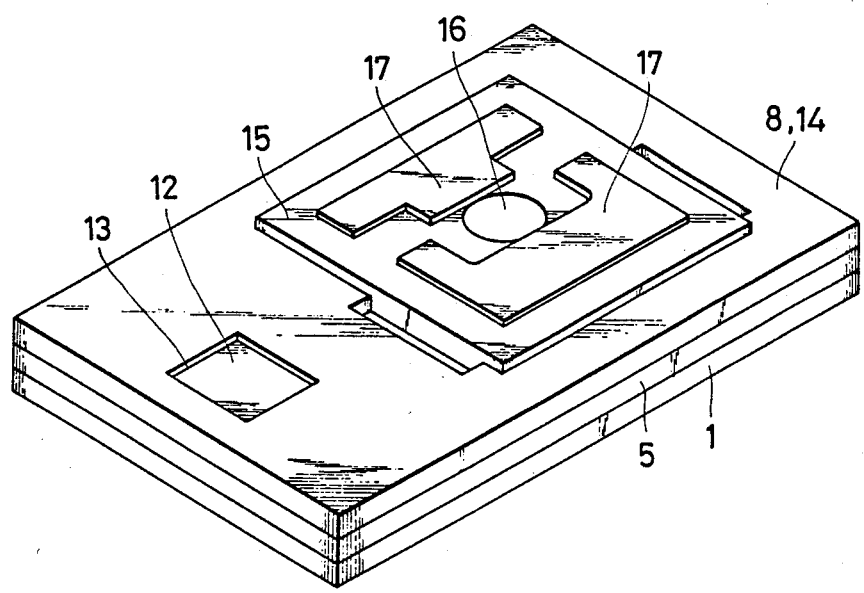
FIG. 17 is a perspective view of the substrate of FIG. 15 after it has passed a valve beam pattern forming step.
Figure 18:
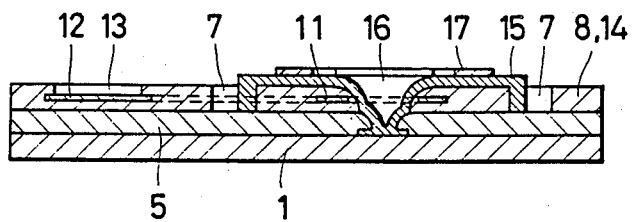
FIG. 18 is a vertical sectional side elevational view of the substrate of FIG. 17.

FIGS. 17 and 18 show the substrate 1 after it has further passed a valve beam pattern forming step. At the step, a photo-resist layer 17 is formed on a surface of a portion of the spacer 15 other than a portion opposing to the nozzle 4 (a portion opposing to the recess 16) and a peripheral portion of the spacer 15.

Figure 19:
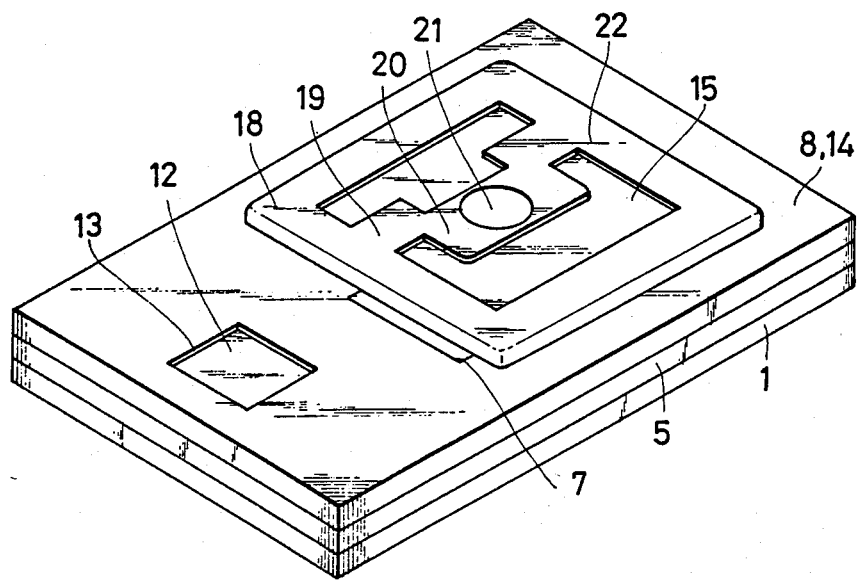
FIG. 19 is a perspective view of the substrate of FIG. 17 after it has passed a valve beam forming step.
Figure 20:
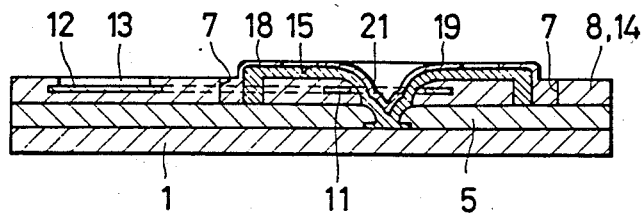
FIG. 20 is a vertical sectional side elevational view of the substrate of FIG. 19.

FIGS. 19 and 20 show the substrate 1 after it has further passed a valve beam forming step. At the step, a metal film 22 is formed on the portion of the surface of the spacer 15 on which the photo-resist layer 17 is not formed in order to form a support frame 18 of a square profile and a valve beam 19 which has opposite ends connected contiguously to the support frame 18. The metal film 22 is formed by nickel plating and is filled also in the openings 7. Accordingly, the opposite ends of the valve beam 19 are connected contiguously to the nozzle plate 5 by way of the support frame 18. Further, the valve beam 19 has a crank-like yieldable portion 20 formed thereon which is projected in a direction perpendicular to the length thereof, and since the yieldable portion 20 of the valve beam 19 is opposed to the recess 16, a valve 21 which extends along an inner face of the recess 16 is formed at the yieldable portion 20.

Figure 21:
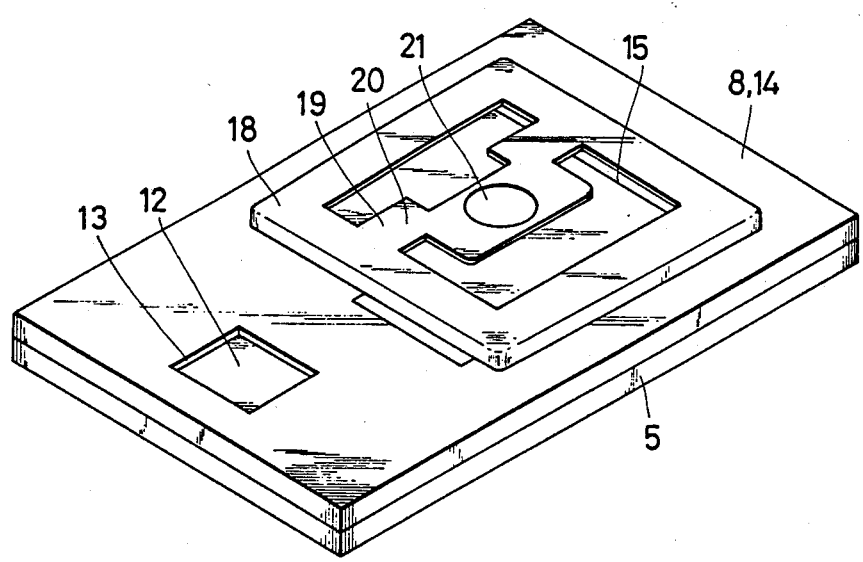
FIG. 21 is a perspective view of an almost completed valve element after the device of FIG. 19 has passed a separating step.
Figure 22:
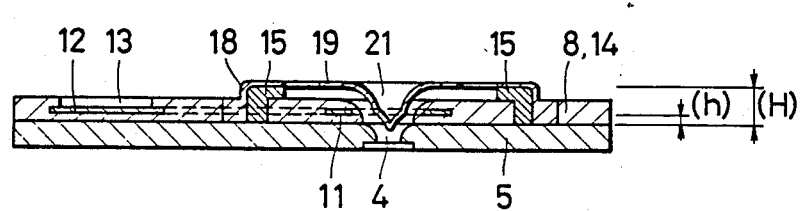
FIG. 22 is a vertical sectional side elevational view of the valve element of FIG. 21.

FIGS. 21 and 22 show a semi-completed valve element after it has passed a separating step. At the step, a central portion of the spacer 15 is removed by etching, and the substrate 1 is exfoliated from the nozzle plate 5. Upon etching of the spacer 15, an ammonia-alkali etchant which has a pH value biased to the alkali side is used so that it may not etch any other metal film. Accordingly, the clearance between an outer circumferential face of the valve 21 and inner circumferential faces of the openings 6 and the nozzle 4 can be made uniform after the central portion of the spacer 15 has been removed. Further, since the substrate 1 is formed from a stainless steel plate while the nozzle plate 5 is made of nickel, they can be exfoliated readily from each other. It is to be noted that there is a relation $h<H$ where H denotes a clearance between the nozzle plate 5 and the valve beam 19, and h denotes a clearance between the nozzle plate 5 and the electrode plate 11.

Figure 23:
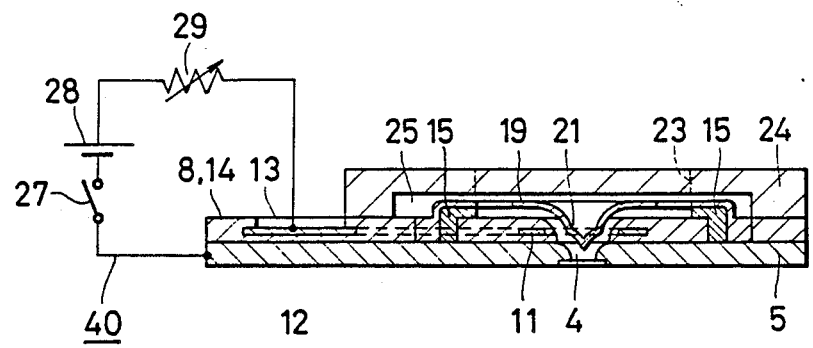
FIG. 23 is a perspective view of a completed valve element after the element of FIG. 21 has passed a cover assembling step.

FIG. 23 shows a completed valve element after passing a cover assembling step. At the step, a cover 24 having an entrance 23 formed therein is sealed on and secured to a surface of the protective layer 40 thereby to form a fluid containing chamber 25 within the cover 24. A switch 27, a power source 28 and a variable resistor 29 which generally constitute a driving means 40 are connected between the nozzle plate 5 and the connecting portion 12 of the electrode plate 11.

Figure 24:
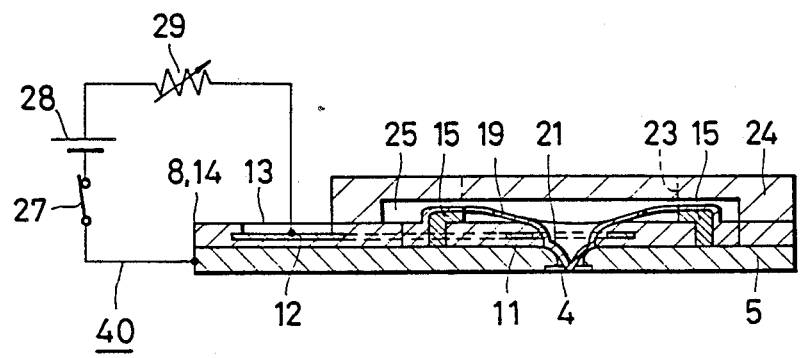
FIG. 24 is a vertical sectional side elevational view of the valve element when a nozzle thereof is closed.

With such a construction of the valve element as described above, as ink is introduced into the fluid containing chamber 25 by way of the entrance 23, if the internal pressure of the fluid containing chamber 25 is raised in a condition of FIG. 23, the ink will be extruded from the nozzle 4. To the contrary, if the switch 27 is turned on to apply a voltage of the power source 28 between the connecting portion 12 of the electrode plate 11 and the valve beam 19, the electrode plate 11 will attract the valve beam 19 thereto due to an attracting force caused by static electricity so that the valve 21 will close the nozzle 4 as shown in FIG. 24. Accordingly, the valve element can be used to fully open or fully close the nozzle 4, that is, the valve element can be used for binary control. However, the outflow rate of ink can be changed infinitely if the voltage to be applied is controlled by means of the variable resistor 29 in accordance with the elasticity of the valve beam 19 to change the yieldably deformed amount or distortion of the valve beam 19. In this instance, since the valve beam 19 has the yieldable portion 20 which is projected in the direction perpendicular to the length thereof, the yielding action of the yieldable portion 20 can be promoted. Consequently, the valve beam 19 can be yieldably deformed with a relatively low voltage to be applied, and accordingly the power consumption can be saved. Further, since the valve beam 19 within the fluid containing chamber 25 is connected contiguously to the nozzle plate 5, it can be connected readily to the power source. It is to be noted that the principle wherein application of a voltage between the electrode plate 11 and the valve beam 19 will cause an attracting force by static electricity to act so that the electrode plate 22 may attract the valve beam 19 thereto is quite similar to the principle disclosed in an article named "Dynamic Micromechanics on Silicon: Techniques and Devices" in "IEEE TRANSACTIONS ON ELECTRON DEVICES, VOL. ED-25, NO. 100, OCTOBER 1978'" annexed hereto.

Further, as the nozzle 4 is closed by an attracting force caused by static electricity between the electrode plate 11 and the valve beam 19, the structure of the valve element can be simplified with a magnet mechanism omitted, and nickel can be used for the nozzle plate 5, valve beam 19 and electrode plate 11. Accordingly, the corrosion resistance can be improved, and a change in dimension of the nozzle 4, valve 21 and so on can be prevented for a long period of time.

Further, the nozzle 4 presents an upwardly curved arcuate cross section. In particular, the nozzle 4 presents an arcuate cross section wherein the slope of a tangential line to the nozzle 4 comes close to the direction of the axis of the nozzle 4 toward the end of the nozzle 4. This configuration of the nozzle 4 is effective to reduce the resistance of the nozzle 4 to fluid when the fluid passes through the nozzle 4 from the valve beam 19 side. Since the valve beam 19 has a similarly arcuate cross section, the resistance thereof to fluid is reduced. Further, when the nozzle 4 is fully closed upon application of a voltage, close contact between the nozzle 4 and the valve beam 19 is assured by the arcuate configurations of them. In addition, since the openings 6 formed in the first insulator layer 8 and the second insulator layer 14 have such a configuration that they are contiguous to the nozzle 4, they are effective to reduce the resistance of the nozzle 4 to fluid when the fluid passes through the nozzle 4.

Further, the nozzle plate 5, first insulator 8, electrode plate 11, second insulator layer 14, spacer 15, valve beam 19 and so on can be layered one on another without depending upon an assembling operation, and the patterns of the nozzle plate 5, electrode plate 11 and valve beam 19 can be formed readily with a high degree of accuracy in dimension with photo-resist layers by plating or by a thin film forming technique. Since the nozzle plate 5 and the valve beam 19 are formed by an electro-forming method in this manner, they can be readily formed with a desired thickness.

Besides, since nickel plating is effected using a non-glazing sulfamic acid nickel bath in which a glazing agent is not used in order to improve the purity of the deposited nickel to lower the elasticity of the valve beam 19, the stress relative to the same distortion of the valve beam 19 can be reduced and the durability of the valve beam 19 can be improved. As a result, where the valve element is used in an ink printer, even if thermally melted ink or dyestuff steam of a high temperature is contained in the fluid containing chamber 25, the heat resistance of the valve beam 19 can be improved.

Figure 25:
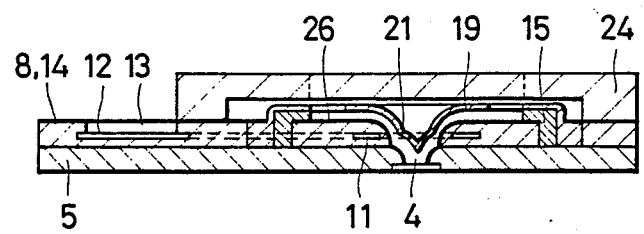
FIG. 25 is a vertical sectional side elevational view showing a modified form to the valve element of FIGS. 23 and 24.

Further, if a protective layer 26 is formed by sputtering or the like of $SiO_2$, $Al_2O_3$, $Si_3O_4$ or a ceramic represented by a composition of these substances on a surface of the second insulator layer 14 as shown in FIG. 25, where the valve element is used in an ink printer, the insulator layers 8 and 14 made of polyimide can be protected from ink or some other dyestuff. The protective layer 26 is formed by means of a protective layer forming step between a second insulator forming step and a spacer forming step.

Figure 26:
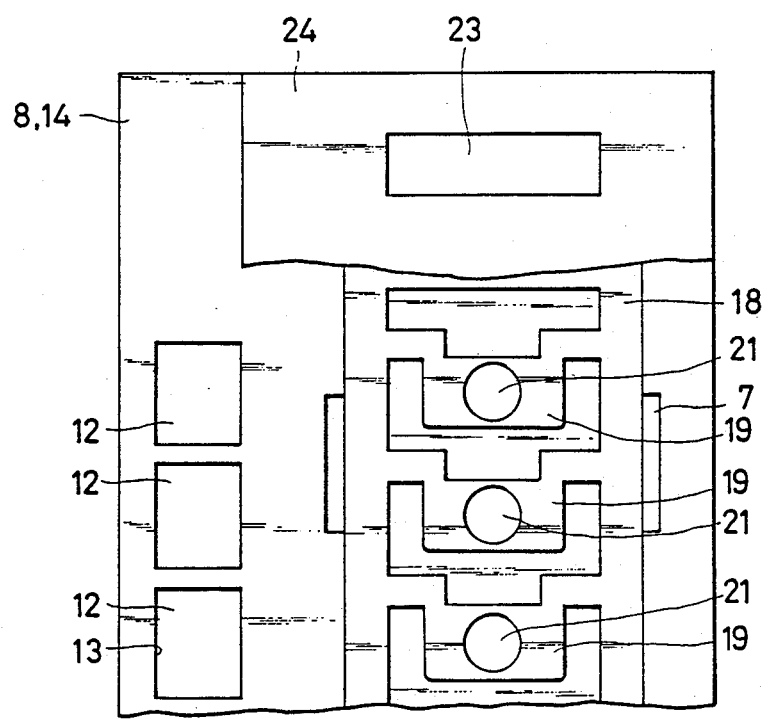
FIG. 26 is a partial plan view of a valve element showing a second embodiment of the present invention.

Now, a second embodiment of the present invention will be described with reference to FIG. 26. Like parts or elements are denoted by like reference numerals to those of the first embodiment, and description thereof will be omitted to avoid redundancy. In the present embodiment, in order for the valve element to be compatible with an ink printer, a plurality of nozzles 4 are formed in a nozzle plate 5 while a plurality of openings 6 corresponding to the nozzles 4 are formed in first and second insulator layers 8 and 14, and a plurality of valve beams 19 each having a valve 21 corresponding to one of the nozzles 4 are formed in a contiguous relationship to opposite ends of a large support frame 18. Accordingly, printing is effected while record paper is moved relative to the valve element in a direction perpendicular to a direction in which the valves 21 are arranged.

Figure 27:
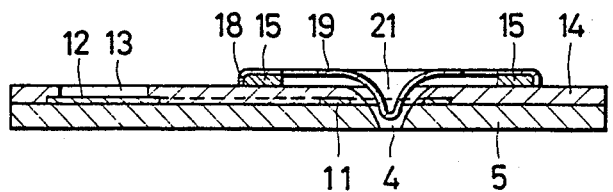
FIG. 27 is a vertical sectional side elevational view of a valve element showing a third embodiment of the present invention.

Now, a third embodiment of the present invention will be described with reference to FIG. 27. A nozzle plate 19 in the present embodiment is formed from a photosensitive glass plate or a photosensitive resin film, and an electrode plate 11 is formed directly on the nozzle plate 19.

Here, since the nozzle plate 19 has a photosensitivity, its nozzle 4 can be made finely and with a high degree of accuracy where it is worked using light. The other steps are similar to those of the first embodiment described above.

Figure 30:
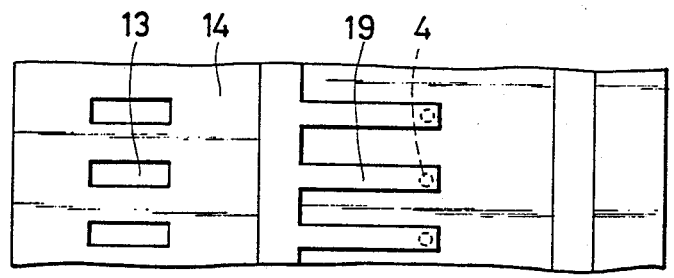
FIG. 30 is a plan view of a valve element for complementary explanation of the embodiment of FIG. 28.
Figure 31:
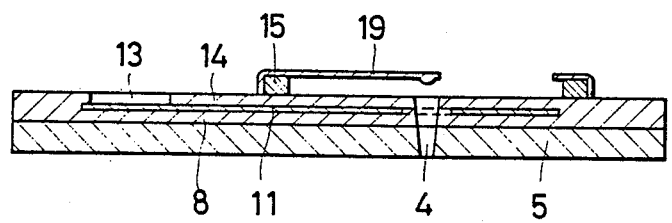
FIG. 31 is a vertical sectional side elevational view of the valve element of FIG. 30.
Figure 32:
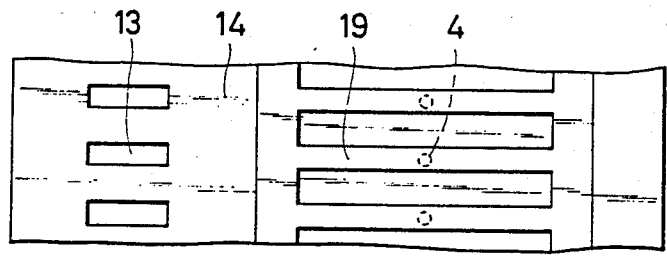
FIG. 32 is a plan view of a valve element for complementary explanation of the embodiment of FIG. 30.
Figure 33:
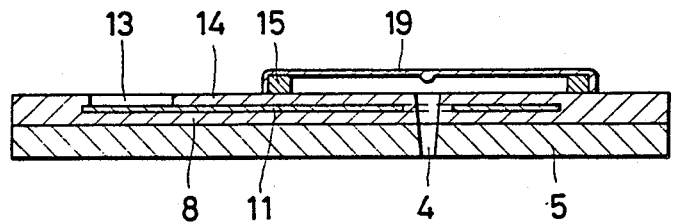
FIG. 33 is a vertical sectional side elevational view of the valve element of FIG. 32.

Next, a fourth embodiment of the present invention will be described with reference to FIGS. 28 and 29. At first, if a shape in which a valve beam 19 itself can be embodied is examined, the valve beam 19 can be formed as a cantilever beam as shown in FIGS. 30 and 31. However, in this instance, if a plurality of such valve beams 19 are arranged in a row, free ends thereof at which valves 21 are formed may readily be turned and the valve beams 19 are not stabilized in working nor in operation and are yieldably deformed readily because the valve beams 19 have a great length relative to the width thereof. To the contrary, it is possible for a valve beam 19 to have a configuration of a both ends supported beam as shown in FIGS. 32 and 33. In this instance, the valve beam 19 itself is stabilized, but because it is not distorted readily, a relatively high voltage is required.

Figure 28:
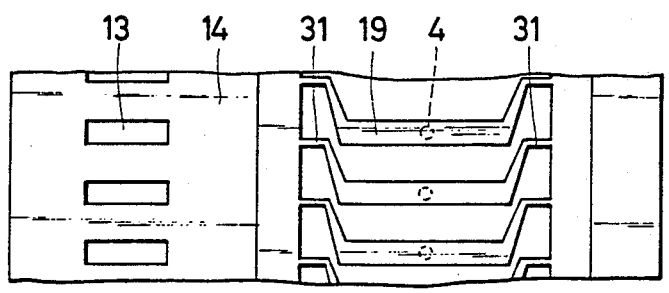
FIG. 28 is a plan view of a valve element showing a fourth embodiment of the present invention.
Figure 29:
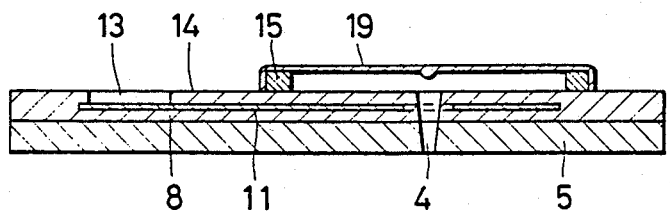
FIG. 29 is a vertical sectional side elevational view of the valve element of FIG. 28.

From such reasons, in the present embodiment of FIGS. 28 and 29, the valve beam 19 has a configuration of a both ends supported beam but has formed at a central portion thereof via a pair of supporting portions 31 a yieldable portion which is projected in a direction perpendicular to the length of the valve beam 19. With the configuration, the stability and the yieldability of the valve beam 19 can be satisfied.

Meanwhile, since the supporting portions 13 have a reduced width in order to attain a suitable elasticity, the valve beam 19 can be yieldably distorted with a relatively low voltage. Further, in order to allow a plurality of such valve beams 19 to be arranged efficiently, the yieldable portion of each of the valve beams 19 has a pair of portions extending in oblique directions.

Figure 34:
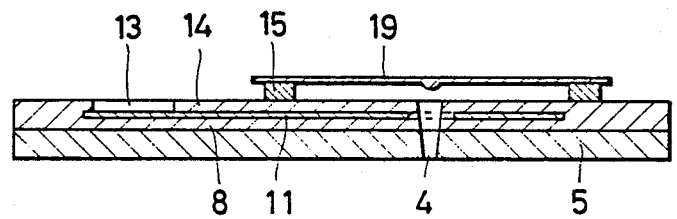
FIG. 34 is a vertical sectional side elevational view of a valve element showing a fifth embodiment of the present invention.

Now, a fifth embodiment of the present invention will be described with reference to FIG. 34. The present embodiment provides a method of securing a valve beam 19 to a nozzle plate 5, and in the present embodiment, the nozzle plate 5 is not integrated by plating with a valve beam 19 through an opening 7 as in the first embodiment described hereinabove but is secured on an insulator layer 14 via a spacer 15. In this instance, materials are selected which are high in close contactness both in a combination of the spacer 15 and the insulator layer 14 and in another combination of the spacer 15 and the valve beam 19.

Figure 35:
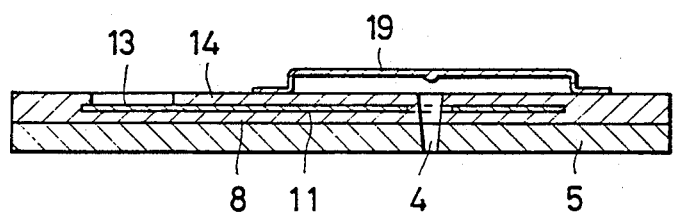
FIG. 35 is a vertical sectional side elevational view of a valve element showing a sixth embodiment of the present invention.

Further, a sixth embodiment of the present invention will be described with reference to FIG. 35. In the present embodiment, a valve beam 19 is closely contacted with and secured directly to an insulator layer 14 but not via a spacer 15. In this instance, polyimide may be used for the insulator layer 14 while nickel may be used for the valve beam 19. In this instance, it is necessary to provide non-electrolytic nickel plating of a high close contactness on a surface of the insulator layer 14.

What is claimed is:

1. A process of producing a valve element, comprising:
    a nozzle pattern forming step of forming a photo-resist layer corresponding to a nozzle on a surface of a substrate;
    a nozzle plate forming step of forming a metal film on the surface of said substrate and removing said photo-resist layer to form a nozzle plate having a nozzle therein;
    a first insulator layer forming step of forming a first insulator layer on a surface of said nozzle plate such that openings may be formed at a location opposed to said nozzle and other predetermined locations;
    an electrode pattern forming step of forming a photo-resist layer on a surface of said first insulator layer around a location opposed to said nozzle;
    an electrode plate forming step of forming a metal film on a surface of said first insulator layer and removing said photo-resist layer to form an electrode plate;
    a second insulator layer forming step of forming on the surface of said first insulator layer a second insulator layer which covers said electrode plate such that openings may be formed in an opposing relationship to said openings of said first insulator layer;
    a spacer forming step of forming a spacer of a material different from a material of said nozzle plate on a surface of said second insulator layer including a location opposed to said nozzle and an area around the location;
    a valve beam pattern forming step of forming a photo-resist layer on a surface of said spacer except a location opposed to said nozzle and a location opposed to a peripheral portion of said spacer;
    a valve beam forming step of forming a metal film on the surface of said spacer to form a valve beam which is contiguous at an end portion thereof to said nozzle plate via one of said openings and which has a valve at a yieldable portion thereof and then removing said photo-resist; and
    a separating step of removing a central portion of said spacer including a portion opposed to said nozzle and then exfoliating said substrate from said nozzle plate.

2. A process of producing a valve element according to claim 1, wherein a stainless steel plate having a surface which is finished into a mirror by polishing is used as said substrate at the nozzle pattern forming step.

3. A process of producing a valve element according to claim 1, wherein a glass plate having a metal film formed on a surface thereof is used as said substrate at the nozzle pattern forming step.

4. A process of producing a valve element according to claim 1, wherein, at each of the first insulator layer forming step and the second insulator layer forming step, the insulator layer is formed from photosensitive polyimide.

5. A process of producing a valve element according to claim 4, wherein, at the second insulator layer forming step, said second insulator layer is heated after it has been formed so that it may be united with said first insulator layer.

6. A process of producing a valve element according to claim 1, wherein said spacer is formed from copper at the spacer forming step.

7. A process of producing a valve element according to claim 6, wherein, at the separating step, said spacer is etched using an ammonia-alkali etchant which has a pH value biased to the alkali side.

8. A process of producing a valve element according to claim 1, further comprising, after the second insulator layer forming step, a protective layer forming step of forming a protective layer of a ceramic of the same profile on said second insulator layer.

9. A process of producing a valve element according to claim 1, further comprising, after the separating step, a cover assembling step of securing a cover to a surface of said second insulator layer.

* * * * *